United States Patent
Chandrasekar et al.

(10) Patent No.: US 9,177,045 B2
(45) Date of Patent: Nov. 3, 2015

(54) TOPICAL SEARCH ENGINES AND QUERY CONTEXT MODELS

(75) Inventors: Raman Chandrasekar, Seattle, WA (US); Parikshit Sondhi, Champaign, IL (US); Robert Rounthwaite, Fall City, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 12/792,288

(22) Filed: Jun. 2, 2010

(65) Prior Publication Data

US 2011/0302172 A1    Dec. 8, 2011

(51) Int. Cl.
   *G06F 17/30* (2006.01)
(52) U.S. Cl.
   CPC ...... *G06F 17/30672* (2013.01); *G06F 17/3064* (2013.01)
(58) Field of Classification Search
   CPC .................................................. G06F 17/3064
   USPC ................................................ 707/748, 768
   See application file for complete search history.

(56) References Cited

U.S. PATENT DOCUMENTS

| | | | |
|---|---|---|---|
| 5,875,446 A | 2/1999 | Brown et al. | |
| 6,691,108 B2 | 2/2004 | Li | |
| 6,701,310 B1 | 3/2004 | Sugiura et al. | |
| 7,392,278 B2 | 6/2008 | Chen et al. | |
| 7,680,860 B1 | 3/2010 | Fordham | |
| 8,626,768 B2 * | 1/2014 | Bailey et al. | 707/738 |
| 2002/0194161 A1 | 12/2002 | McNamee et al. | |
| 2009/0164895 A1 * | 6/2009 | Baeza-Yates et al. | 715/700 |
| 2009/0265331 A1 | 10/2009 | Chandrasekar et al. | |
| 2010/0057716 A1 | 3/2010 | Stefik et al. | |
| 2010/0082752 A1 * | 4/2010 | Donato et al. | 709/206 |

OTHER PUBLICATIONS

Carstens, "Effects of Using a Research Context Ontology for Query Expansion", 2009, ESWC 2009 Heraklion Proceedings of the 6th European Semantic Web Conference on the Semantic Web: Research and Applications.*
Hoeber et al, "Conceptual Query Expansion", 2005, In Proceedings of the Third International Atlantic web Intelligence Conference.*
Weinberger et al., "Resolving Tag Ambiguity", Oct. 2008, ACM.*
Srinivasan et al., "Target Seeking Crawlers and their Topical Performance", Aug. 2002, ACM.*
Poblete, Dr. Searcher and Mr. Broser, A unified hyperlink-click graph, 2008.*
Klemke, Roland. Modelling context in information brokering processes. Diss. Bibliothek der RWTH Aachen, 2002.*
Stopford, Benjamin. "The Topic Specific Search Engine," (2006).*

(Continued)

*Primary Examiner* — William Spieler
(74) *Attorney, Agent, or Firm* — Steve Wight; Doug Barker; Micky Minhas

(57) ABSTRACT

Topical search engines can add contextual keywords to an input query to bias results toward a particular topic or domain. In one instance, query context models can be constructed to facilitate topical search. Upon receipt of one or more topic-relevant sites, a plurality of topical queries can identified automatically. Contextual keywords can be identified with respect to the plurality of topical queries as a function of lexical generality, among other things. Subsequently, a query context model, comprising the identified topical queries and related contextual keywords, can be employed to restrict query results to a particular topic.

20 Claims, 12 Drawing Sheets

(56) References Cited

OTHER PUBLICATIONS

The Power of Topic Specific Search Engines—Published Date: Apr. 12, 2010 http://www.workz.com/content/view_content.html?section_id=475&content_id=6801.

[1] K. Bharat, and M. R. Henzinger. Improved algorithms for topic distillation in a hyperlinked environment. In Proceedings of SIGIR-98 (Melbourne, AU, 1998), ACM Press, 104-111.

S. Chakrabarti, M. van den Berg and B. Dom. Focused Crawling: a New Approach to Topic-Specific Web Resource Discovery, 1999. Proceedings of WWW 1999.

R. Chandrasekar, H. Chen, S. Corston-Oliver, and E. Brill. Subwebs for specialized search. In Proceedings of SIGIR-2004 (Sheffield, UK, Jul. 2004), ACM Press, 480-481.

H. Chang, D. Cohn, and A. K. McCallum. Learning to create customized authority lists. In Proc. 17th ICML (Stanford, CA, 2000), Morgan Kaufmann, San Francisco, CA, 127-134.

S. Cronen-Townsend, Y. Zhou, and W. B. Croft. 2002. Predicting query performance. In Proceedings of SIGIR-2002 (Tampere, Finland, Aug. 11-15, 2002). ACM, New York, NY, 299-306.

D. Gibson, J.M. Kleinberg, and P. Raghavan. Inferring web communities from link topology. In UK Conference on Hypertext, pp. 225-234, 1998.

E. Glover, G. Flake, S. Lawrence, W. P. Birmingham, A. Kruger, C. L. Giles, and D. Pennock. Improving category specific web search by learning query modifications. In Symposium on Applications and the Internet, SAINT, (San Diego, CA, Jan. 2001) IEEE, 23-31.

Google Custom Search Engine. http://www.google.com/cse/.

C. Hauff, V. Murdock, and R. Baeza-Yates. 2008. Improved query difficulty prediction for the web. In Proceeding of CIKM '08 (Napa Valley, California, USA, Oct. 26-30, 2008). CIKM '08. ACM, New York, NY, 439-448.

T. H. Haveliwala. 2002. Topic-sensitive PageRank. In Proceedings of the WWW 2002. (Honolulu, Hawaii, USA, May 7-11, 2002). ACM, New York, NY, 517-526.

He, and I. Ounis. 2006. Query performance prediction. Inf. Syst. 31, 7 (Nov. 2006), 585-594.

J. M. Kleinberg. Authoritative sources in a hyperlinked environment. Journal of the ACM, 46(5):604-632, 1999.

R. Kraft, C. C. Chang, F. Maghoul, and R. Kumar. 2006. Searching with context. In Proceedings of WWW '06 . (Edinburgh, Scotland, May 23-26, 2006). WWW '06. ACM, New York, NY, 477-486.

A. Kruger, C. Lee Giles, F. Coerzee, E.J. Glover, G.W. Flake, S. Lawrence, C.W. Omlin, DEADLINER: Building an New Niche Search Engine, In Proc. CIKM 2000, pp. 272-281.

S. Lawrence, K. Bollacker and C. Lee Giles, Indexing and Retrieval of Scientific Literature, In Proc. CIKM 99, pp. 139-146.

Rollyo site. http://rollyo.com.

B. Smyth, E. Balfe, J. Freyne, P. Briggs, M. Coyle, and O. Boydell. 2005. Exploiting Query Repetition and Regularity in an Adaptive Community-Based Web Search Engine. User Modeling and User-Adapted Interaction 14, 5 (Jan. 2005), 383-423.

J. Teevan, S. T. Dumais and E. Horvitz (2005). Personalizing search via automated analysis of interests and activities. In Proceedings of SIGIR 2005.

P. Thomas, and D. Hawking. 2006. Evaluation by comparing result sets in context. In Proceedings of CIKM '06. ACM, New York, NY, 94-101.

A. Turpin, and W. Hersh. 2004. Do clarity scores for queries correlate with user performance?. In Proceedings of the 15th Australasian Database Conference—vol. 27 (Dunedin, New Zealand). K. Schewe and H. Williams, Eds. ACM International Conference Proceeding Series, vol. 52, pp. 85-91.

R. Song, Z. Luo, J. Nie, Y. Yu, and H. Hon. 2009. Identification of ambiguous queries in web search. Inf. Process. Manage. 45, 2 (Mar. 2009), 216-229.

* cited by examiner

TOPICAL SEARCH ENGINES AND QUERY CONTEXT MODELS

BACKGROUND

Search engines are utilized to maximize the likelihood of locating relevant information amongst an abundance of data. For instance, search engines are often employed over the World Wide Web (a.k.a. web) to facilitate locating and accessing websites of interest as a function of a search query comprising one or more keywords and operators. Upon receipt of a query, the search engine retrieves a list of websites that match the query, generates a snippet of text associated with the websites, and displays the websites and text, typically ranked based on relevance. The user can thereafter scroll through a plurality of returned websites in an attempt to identify information of interest. However, this can be an extremely time-consuming and frustrating process since search engines can return a substantial amount of content that often is irrelevant to a user's intent.

One way to address the substantial amount of content returned by search engines is to restrict search to a set of relevant websites, which can be accomplished in a variety of ways including site search and custom search engines (CSE). Site search is typically realized using custom search engines by restricting web search results to one or more sites. This behavior is often harnessed by using a "site" query operator on a search engine. For example, the query "flash site:abc.com" returns web pages from "abc.com" that match the query term "flash." Further, some custom search engines permit users to manually specify a set of relevant websites and filter result sets to return only pages from these sites, and also allow for fixed keywords to be added to query terms before a search is issued.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally concerns topical search as well as generation and utilization of query context models to facilitate production of topical search systems. Technology is provided for automatically identifying queries related to a topic and identifying suitable query context to be added to these queries as a function of lexical generality, among other things. A generated query context model can comprise both queries and query context related to a particular topic or domain and be employed to bias received queries toward the particular topic or domain. By way of example, general contextual keywords from the query context model can be added to an ambiguous or underspecified query and provided to a search engine, wherein the contextual keywords influence returned results.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Consider an individual such as a website owner or blogger who wants to provide a search interface on a web page or the like. Currently, the individual has essentially two options: general web search or custom site search. When a query is matched to a plethora of documents over the Internet, results from a web search can be too broad and irrelevant to search intent. By contrast, custom site search services require individuals to compile and maintain lengthy uniform resource locator (URL) lists. Given the dynamic nature of the web, it is impractical for most users to maintain such comprehensive up-to-date lists. An alternative approach of creating a separate topic specific document collection is expensive in terms of both resources and time and is not a viable option for most users. Still further approaches are not suited for this problem space because they are limited in some way, far too specific, or require extensive manual effort.

Details below are generally directed toward topical search engines and creation thereof with minimal manual effort. Topical search engines focus search results on specific topics or domains (e.g., photography, automobiles, home improvement, golf, fishing . . . ). In accordance with one aspect, contextual keywords can be added to queries to bias a search towards a particular topic. Further, constraints can be imposed that control the type (e.g., lexical generality, co-occurrence . . . ) and number of contextual keywords to be added as well as whether or not any contextual keywords are added at all. In accordance with one embodiment, such search engines or systems can employ query context models to provide contextual keywords for various topic related queries.

A query context model can be generated automatically from one or more topic-relevant documents or URLs, amongst other data according to an aspect of the disclosure. After a number of queries are extracted from provided and discovered URLs, topic-related or contextual keywords pertaining to the queries can be identified as a function of lexical generality, among other things.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
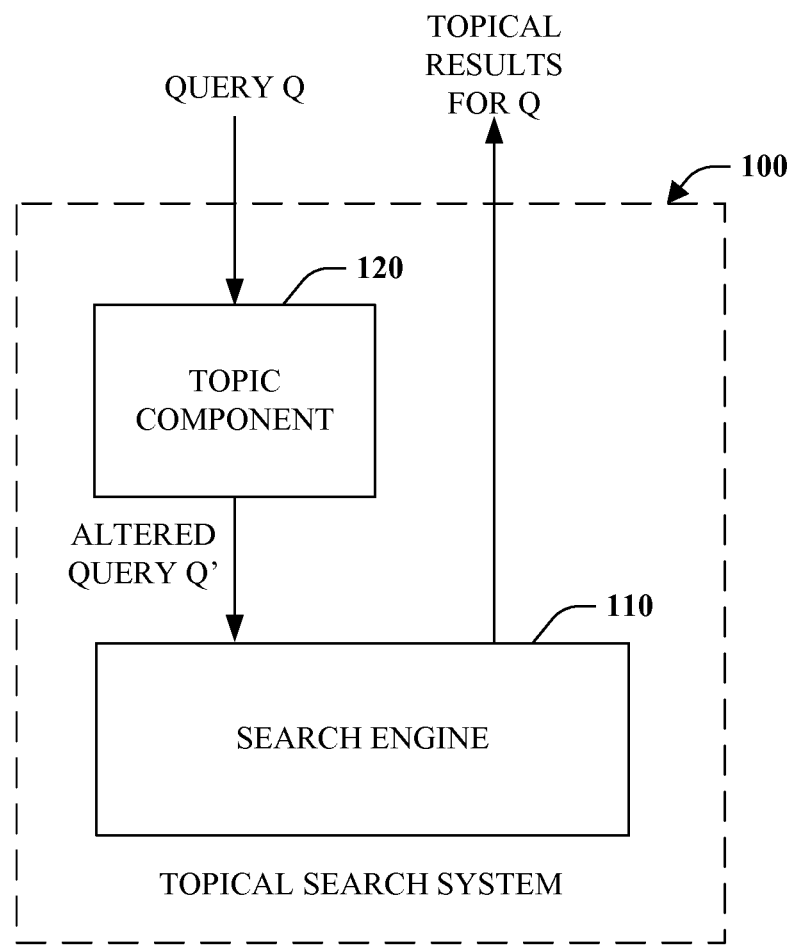
FIG. 1 is a block diagram of topical search system.

Referring initially to FIG. 1, an embodiment of a topical search system 100 is illustrated. The topical search system 100 includes a search engine 110 for receiving queries and returning results. The search engine 110 can correspond to a general or generic web search engine or a more specific or specialized search engine all of which are known in the art. Furthermore, although described herein with respect to the web, the search engine 110 is not limited thereto and can operate over any collection of data. The topical search system 100 also includes a topic component 120 configured to intercept queries destined for the search engine in order to alter the queries and subsequently provide the altered queries to the search engine 110. More specifically, the topic component 120 can add suitable context information to a query to focus results on a particular topic or domain.

A topical query typically performs poorly with respect to search engines and particularly to general search engines due in part to ambiguity. For example, since general search engines are optimized for result diversity, for any ambiguous query, the top results will likely span multiple topics. This reduces the number of results that are useful for a user, or in other words, that are directed to the user's search intent. For example, suppose a user submits a query "EOS" hoping to obtain results for "Canon EOS cameras." General search engines will return one or two useful results in the top ten while the rest are directed to other uses of the word.

In order to realize topic-focused search, queries can be identified and disambiguated. It is, however, not trivial to decide whether a query is ambiguous. For example, query performance prediction has been employed to address this problem, but there are several issues that make such methods impractical. However, the problem of identifying ambiguity can be obviated all together. Specifically, a check can be made as to whether a query is topic related or not, rather than if it is ambiguous. For any topic related query, the query can be focused on documents of a specific topic by adding appropriate contextual keywords so the results are constrained to the topic of interest as will be described further below. Further, care should be taken when adding context so as not to change the original query intent.

For example, by adding the word "Canon" to "EOS," top search results become photography related without altering the original query intent. For a different query, some other word can be added. However, simply adding generic keywords like "camera" or "photography" to every query does not work as well. For instance, not every site related to photography includes these words, and adding them might actually decrease the relevance of the results returned.

As shown in topical search system 100, a query "Q" can be issued by an end user, for instance, desiring to acquire results related to a particular topic. The topic component 120 can receive the query "Q" and change the query "Q" to "Q'=Q+ C," which adds a set of contextual/topic-related keywords "C" to the originally issued query "Q" to produce altered query "Q'." Altered query "Q'" is subsequently provided to search engine 110, which returns results. In this manner, an alteration can be achieved "Q→Q'" such that the results are highly relevant to "Q" in the context of the particular topic.

Query "Q" can be either ambiguous and topic related or unambiguous and topic related. If "Q" is ambiguous and topic related, "Q" is disambiguated by context addition. If "Q" is unambiguous and topic related, then the addition of context does not change the intent of "Q." Further, if there is not enough or suitable contextual information, the query "Q" need not be altered. This prevents degradation of query performance (e.g., "Do no harm" principle). Thus, queries can be augmented without having to classify them as ambiguous or unambiguous. In addition, owing to the "Do no Harm" principle, queries, which are not topic-related, can remain unaltered.

As shown, the topic component 120 is separate from the search engine 110. In other words, the topic component 120 can act as a low-overhead topical wrapper with respect to the search engine 110 in one embodiment. In this manner, the search engine does not have to be changed, or more specifically search indexes, ranking strategies, and/or result processing can remain unchanged. However, the disclosed subject matter is not limited thereto, and the functionality of the topic component 120 can be incorporated within the search engine 110 in an alternate embodiment. Similarly, while the topic component 120 and/or search engine 110 can employ a query context model to facilitate topical search, as described below, the subject application and appended claims are not limited thereto.

Figure 2:
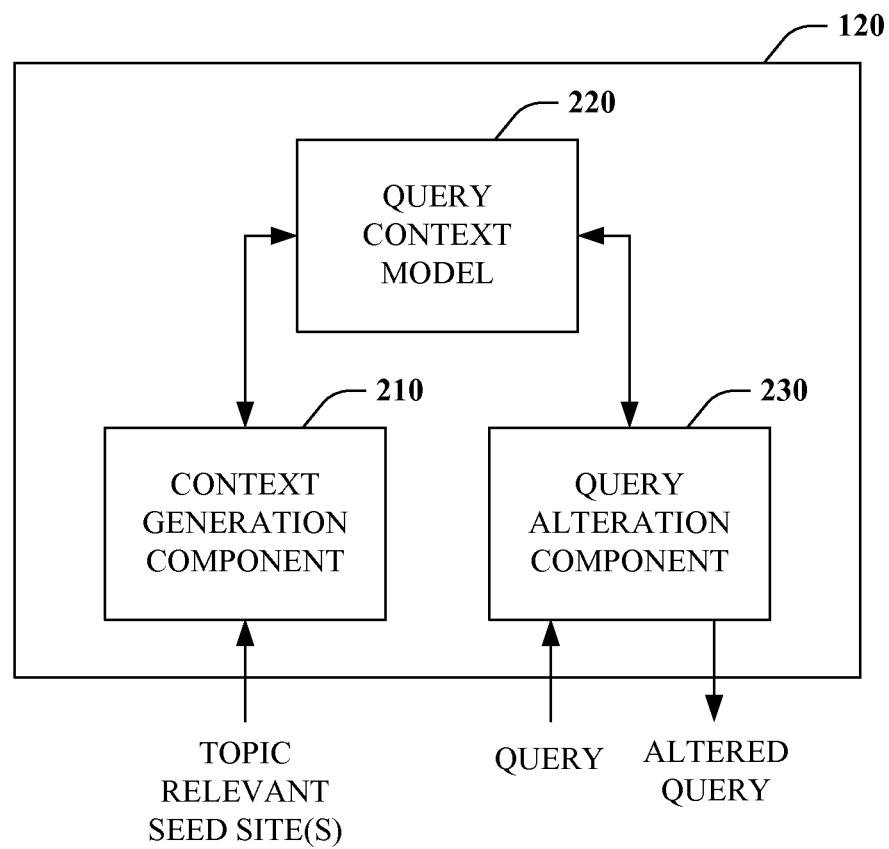
FIG. 2 is a block diagram of a representative topic component.

FIG. 2 depicts a representative topic component 120 in further detail. The topic component 120 includes a context generation component 210, query context model 220, and query alteration component 230. The context generation component 210 receives, retrieves, or otherwise acquires one or more topic relevant documents or seed sites (e.g., URLs) from a topical search system designer such as a website owner or blogger, for example. From these seed sites, among other things, the context generation component 210 produces the query context model 220 specific to a particular topic or domain (e.g., photography, cars, home improvement, golf . . . ). Although not limited thereto, in one instance, the query context model 220 can be embodied as a context list that stores potential contextual keywords for a number of topic-relevant queries (also referred to generically herein as n-grams or n-gram queries meaning queries comprising "n" query keywords).

Table 1 below shows a sample query context model 220 or context list that can be generated by the context generation component 210 with respect to the topic of photography.

TABLE 1

| QUERY | CONTEXT |
|---|---|
| Evolt | Olympus: 0.9, camera: 0.7, digital 0.5 |
| Alpha | Sony: 0.95 |
| Focus | camera: 0.9 |
| Powershot | Canon: 0.9 |
| Nikkor | Nikon: 0.7 |
| Sandisk | memory: 0.8, card: 0.8 |

Here, for example, "Olympus" is a potential context for "evolt" with confidence 0.9 and "camera" is a potential context with confidence 0.7. "Alpha" is disambiguated with "Sony," and so forth. Notice that some terms that are reasonably unambiguous, like "Nikkor," still have context defined, which does not change the intent of the query keyword.

In one embodiment, generation of the query context model 220 can be performed as an offline operation once per topic, when the topical search engine is created, for instance. Further, generation can include building a subweb of topic related queries and URLs, identifying co-occurring keywords for each query in the subweb, and for each query selecting contextual, or in other words topic-related, keywords that satisfy certain constraints including those related to lexical generality, among other things.

The query context model 220 may need to be updated periodically, but updating requires little or no manual effort. Additionally, since topic or domain related keywords and their relationships are relatively stable, the query context model 220 need not be updated as frequent as for a manually specified URL list, for instance.

The query alteration component 230 generally performs online functionality described with respect to the topic component 120 in FIG. 1. More specifically, upon receipt of a query, the query alteration component 230 can utilize the query context model 220 to identify and add context to the query to produce an altered query. In a simple example, if the query includes a single query keyword "Focus," the query alteration component 230 can look up the query and locate "camera" as the context to be added to the query. Of course, more than one context keyword can be added to a query. For example, for the query "Evolt," "Olympus," "camera," and "digital" can be injected as context.

Figure 3:
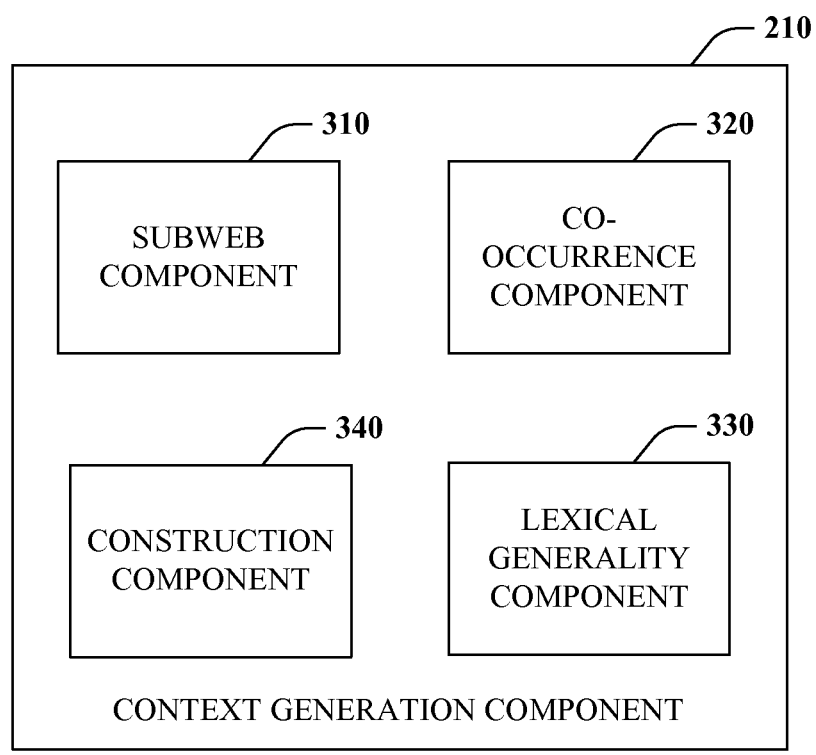
FIG. 3 is a block diagram of a representative context-generation component.

FIG. 3 illustrates a representative context-generation component 210 in further detail include a subweb component 310, co-occurrence component 320, lexical generality component 330, and construction component 340. The subweb component 310 produces a subweb or in other words a collection of topic or domain specific URLs and queries, wherein each unique URL and query can include a corresponding domain relevance weighting.

Figure 4:
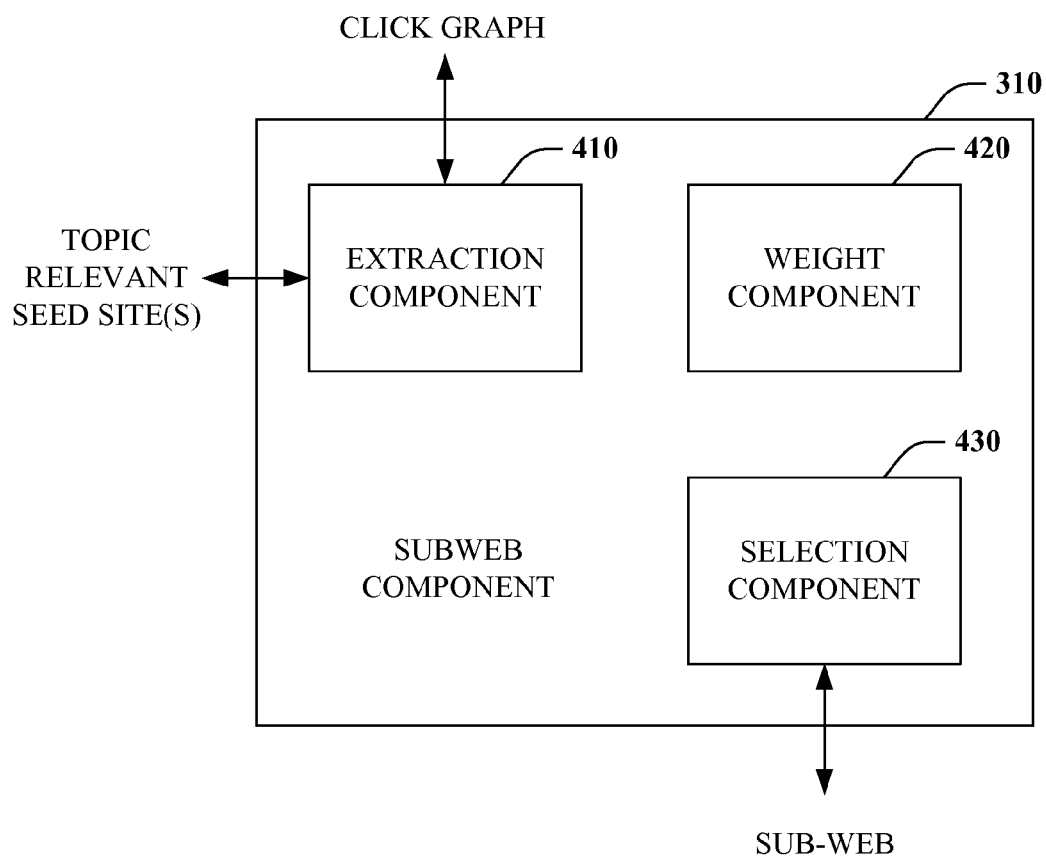
FIG. 4 is a block diagram of a representative subweb component.

Turning briefly to FIG. 4, a representative subweb component 310 is depicted in further detail. As shown, the subweb component 310 includes an extraction component 410 that automatically extracts URLs and queries from topic relevant seed sites and a click graph. A topical search engine creator can provide a small initial set of preferably authoritative and highly topic relevant websites "S." The more relevant the websites are the less chance there is of identifying off-topic queries and URLs. The extraction component 410 can subsequently extract query-URL pairs from the click graph (e.g., record of users' queries, the URLs they clicked on, and the number of times a user clicked on a specific URL when they issued a particular query) where the URL is one of the seed sites "S," or where the URL is a sub-site of one of the sites in "S." Additionally, URLs linked to queries identified and queries linked to URLs identified can be found.

Weight component 420 of the subweb component 310 assigns weights to queries and URLs to aid in controlling the size of a generated subweb and otherwise limiting the subweb to the best URLs and queries. For example, each query can be assigned an initial weight equal to the number of sites in "S" where the query "q" occurs in the click graph. When URLs linked to identified queries are found, a weight threshold can be utilized to limit the URLs selected. Subsequently, weights for each newly identified URL can be updated, for example with the sum (over all queries) of all average weights of the queries, where average weight of a query is its weight divided by the number of selected URLs linked to it. Similarly, queries for all identified URLs are located that have a weight greater than a threshold and newly identified queries weights are updated, for instance with the sum (over all URLs) of average weights of the URLs, where average weight of a URL is its weight divided by the number of selected queries linked to it.

The subweb component 310 also includes a selection component 430 that selects or otherwise identifies URLs from subweb URLs with a weight greater than a threshold and their corresponding queries. This set of queries and URLs along with their weights can form the subweb. At the end of the process, the URLs identified in the subweb are a large but not comprehensive list of web pages for a given topic. The subweb need not be complete, rather the subweb should include a sizeable proportion of topic related URLs and queries.

Various parameters or thresholds can be utilized to control the precision and size of the subweb being constructed. For example, low values of these parameters are likely to bring in non-domain query/URL pairs while high values are likely to miss some of the domain query/URL pairs.

Returning to FIG. 3, the co-occurrence component 320 derives co-occurrence scores between query keywords in identified in the subweb. To facilitate clarity and understanding, a sample hypothetical subweb for photography with only two URLs is shown in Table 2 below:

TABLE 2

| ####### | |
|---|---|
| URL 1: xxxxxxxxxxxxxxxxxxxxxxxx | |
| Olympus 300 | 10 |
| E300 | 10 |
| Olympus Camera | 5 |
| Olympus models review | 10 |
| ####### | |
| URL 2: yyyyyyyyyyyyyyyyyyyyyyyy | |
| Olympus Reviews | 10 |
| Olympus model reviews | 5 |
| ####### | |

For each URL, a set of queries are specified and for each query-URL pair the number of clicks observed is denoted. To calculate the co-occurrence scores between keywords a modified bag of words approach for text documents can be used. More specifically, each URL can be treated as a pseudo-document and all corresponding query keywords as words in the pseudo-document. The frequency of an n-gram query (e.g., query with "n" query keywords) can be considered equal to the sum of all the clicks it received. For example, the frequency of the unigram "Olympus" in URL1 is 25 (10+5+10). For ease of use, the terms URL and pseudo-document are used interchangeably.

An n-gram query "n1" and a related keyword "c1" are said to co-occur if they appear together in the same pseudo-document "d." The frequency of co-occurrence between "n1" and "c1" in a pseudo-document "d" is given by the lesser of the two frequencies:

$$Freq_d(n1 \cap c1) = \min(Freq_d(n1), Freq_d(c1))$$

The total frequency over the subweb is calculated by summing the individual frequencies over all documents:

$$Freq_{Subweb}(n1 \cap c1) = \sum_{d \in all\ subweb\ URLs} Freq_d(n1 \cap c1)$$

For instance in the sample subweb in Table 2, the co-occurrence frequency of two unigrams 'E300' & 'Olympus' is given by:

$$Freq_{subweb}(E300 \cap Olympus) = Freq_{URL1}(E300 \cap Olympus) + Freq_{URL2}(E300 \cap Olympus) = \min(Freq_{URL1}(E300), Freq_{URL1}(Olympus)) + \min(Freq_{URL2}(E300), Freq_{URL2}(Olympus)) = \min(10,25) + \min(0,15) = 10$$

Although not limited thereto, pseudo-document co-occurrence can be used instead of query co-occurrence since it helps in finding relationships between keywords that do not appear with high enough frequency in the same query. Thus as in the above example, even if "E300" and "Olympus" do not appear in the same query, they still have a non-zero co-occurrence score. The same approach can be applied for n-gram queries of higher order. For example:

$$Freq_{URL1}(E300 \cap Olympus\ Camera) = min(10,5) = 5$$

Since n-gram frequencies vary a lot within the subweb, the strength of a relationship between "n1" and "c1," "CScore (c1,n1)," can be measured by normalizing the co-occurrence frequency with the n-gram frequency, that is:

$$CScore(c1, n1) = \frac{Freq_{subweb}(c1 \cap n1)}{Freq_{subweb}(n1)}.$$

Intuitively this means that "c1" would be strongly related to "n1" if it appears with a large percentage of "n1"'s occurrences. Alternatively, "CScore(c1,n1)" can be viewed as the maximum likelihood estimate of the conditional probability "P(c1|n1)." That is, it measures the probability of the keyword "c1" co-occurring in a pseudo-document given the observation of "n1" in the pseudo-document.

The lexical generality component 330 determines the lexical generality score of keywords. Given a set of topical queries, the lexical generality (LG) of a keyword is the number of other unique keywords that the keyword appears with in queries. The lexical generality of an n-gram is then considered equal to the lexical generality score of its most general keyword. For instance, consider the following set of three queries "'olympus model review,' 'olympus review,' and 'olympus camera model.'" Here, the lexical generality score for "olympus" is three, the score for "model" is three, the score for "camera" is two, and the score for "olympus model review" is equal to the lexical generality score of "olympus," which is three.

If the chosen query set is topic specific, the lexical generality scores enforce a partial order on all the keywords based on their "importance" in the domain. This property plays a role in selecting contextual or topic-related keywords.

An alternate approach to defining lexical generality could be to use subweb frequency ("$Freq_{subweb}$") of a keyword instead of the approach described above. However, empirical evidence suggests that subweb frequency is more representative of popularity than generality of a keyword. For example, users submit a lot more queries for brand keywords like "Sony" or "Canon" as compared to the keyword "camera." Thus, ordering based on subweb frequency would make brand names more general than "camera," which is undesirable.

The construction component 340 can utilize the subweb created by the subweb component 310, co-occurrence scores produced by the co-occurrence component 320, and lexical generality scores produced by the lexical generality component 330 to construct a query context model, which in one embodiment can be a context list including queries and contextual keywords. In particular, the construction component 340 can implement various constraints on contextual or topic-related keywords "C" to ensure the query context model aids but does not harm topical and other searches. For example such constraints can be but are not limited to the following:

1. For every concept keyword c∈C, LG(c)>LG(q)
2. |C|≤MAXC, max number of contextual keywords to add.
3. One of the following holds
   a. Every c∈C has CScore(c,q)≥HighC
   b. LG(q)<HighG and every c∈C has HighC≥CScore (c,q)≥LowC and |C|=MAXC The first constrain prevents a query from being over-specified. For example, "Canon" and "powershot" are both highly correlated, and LG("Canon")>LG("powershot"). Thus, "Canon" can be added as context to "powershot" without changing its intent, but "powershot" should not be added as context to "Canon."

The second constraint prevents adding too much context. Adding context beyond a maximum number of keywords can eventually negatively affect result relevance.

The third constraint ensures the query is shifted towards a large number of topic-related documents. Recall, the definition of co-occurrence scores: a high score between a query keyword "q" and a context keyword "c" means that "c" occurs in many topic-related documents in which "q" occurs. Constraint 3a asserts that a single high scoring keyword is enough to shift the query sufficiently—there is no need to add any moderately scoring keywords. On the other hand, constraint 3b says that if no high scoring keywords are available and "q" does not have a high lexical generality score, then either a maximum number of moderately related contextual keywords will be added or no contextual keywords will be added at all. For keywords with low lexical generality, to shift the query "q" towards a sizeable percentage of all its topic related documents, a single moderately related keyword will not be sufficient and as such, multiple moderately related keywords can be added. In one implementation, the maximum number of context keywords can be four. Keywords with a high generality score are likely related to a large number of documents in the subweb; hence, if a highly correlated context is absent then additional context is not added to prevent harm.

The above constraints can be used to find potential contexts for all unigrams, bigrams, and trigrams in the subweb. These constitute the context list.

The values of bounds or thresholds for high and low co-occurrence scores "HighC" and "LowC" and the bounds or thresholds for high generality score "HighG" can be set based on application requirements. By way of example and not limitation, these scores can be set to 0.75, 0.10, and 50 respectively regardless of topic. This means that for a keyword "c" to be added as context to any keyword "q," "c" should co-occur in at least 75% of documents in which "q" occurs. Alternatively, if "q" has a generality score lower than 50 and there is no "c" with co-occurrence over 75%, then multiple context keywords with at least 10% co-occurrence will be added. These parameters essentially allow specification of context when there is sufficient information to confidently add contextual keywords without departing from search intent.

Figure 5:
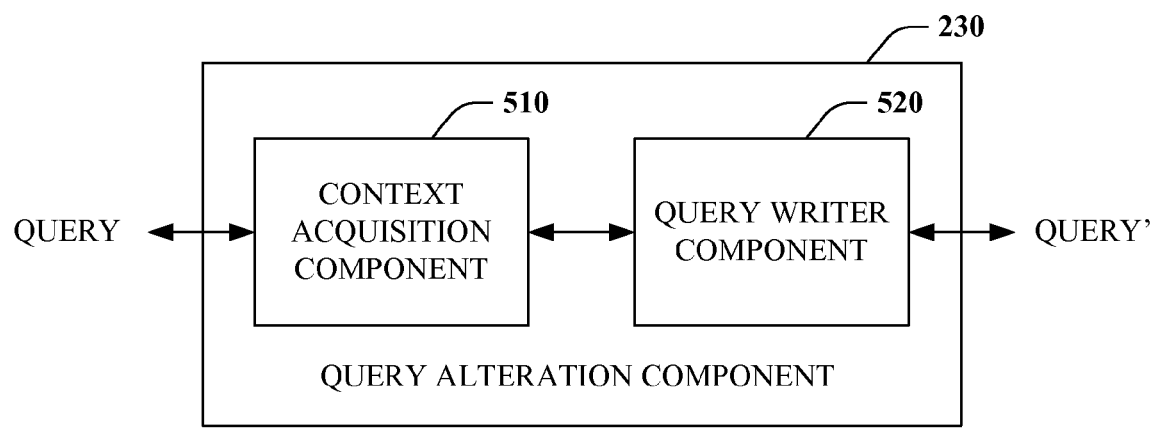
FIG. 5 is a block diagram of a representative query-alteration component.

Turning attention to FIG. 5, a representative query-alteration component 230 is depicted including a context acquisition component 510 and a query writer component 520. The context acquisition component 510 selects a context for a query using query context model or in one embodiment a context list, as previously described. The context acquisition component 510 can start by looking for an entire query in the context list and, if present, return the context specified. Otherwise, a highly related context keyword can be added for each of a query's keywords in turn (e.g., round robin fashion). The addition of each keyword in turn ensures that the query shifts towards topical documents related to all query keywords. Since the maximum content size is limited, only one or two context keywords can selected per query keyword. Therefore, moderately related contexts need not be used here.

Once context keywords are identified, the query writer component 520 can add them to an original query to produce an altered query. The exact syntax used to produce an altered or modified query can depend on the underlying search platform. For example, a "use only for ranking" query operator, if available, can be employed that signals to a search engine to effectively and efficiently identify all documents matching a query "Q" and then rank the matching documents using both "Q" and context "C." Alternatively, for a TF-IDF (Term Frequency-Inverse Document Frequency) based ranker, lower weights can be assigned to contextual keywords. Of course, in a Boolean setting the query "Q" and the contextual keywords "C" can be combined with an "AND" or with an "OR."

As will be appreciated, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the context generation component 210 can employ such mechanisms to facilitate generation of a query context model, for instance based on imperfect or unavailable information. Such mechanisms can be utilized additionally or alternatively to determine or infer whether or not to add context to a query so as not to degrade performance with respect to user's search intent, for instance.

In view of the exemplary systems described supra, methodologies that may be implemented in accordance with the disclosed subject matter will be better appreciated with reference to the flow charts of FIGS. 6-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 6:
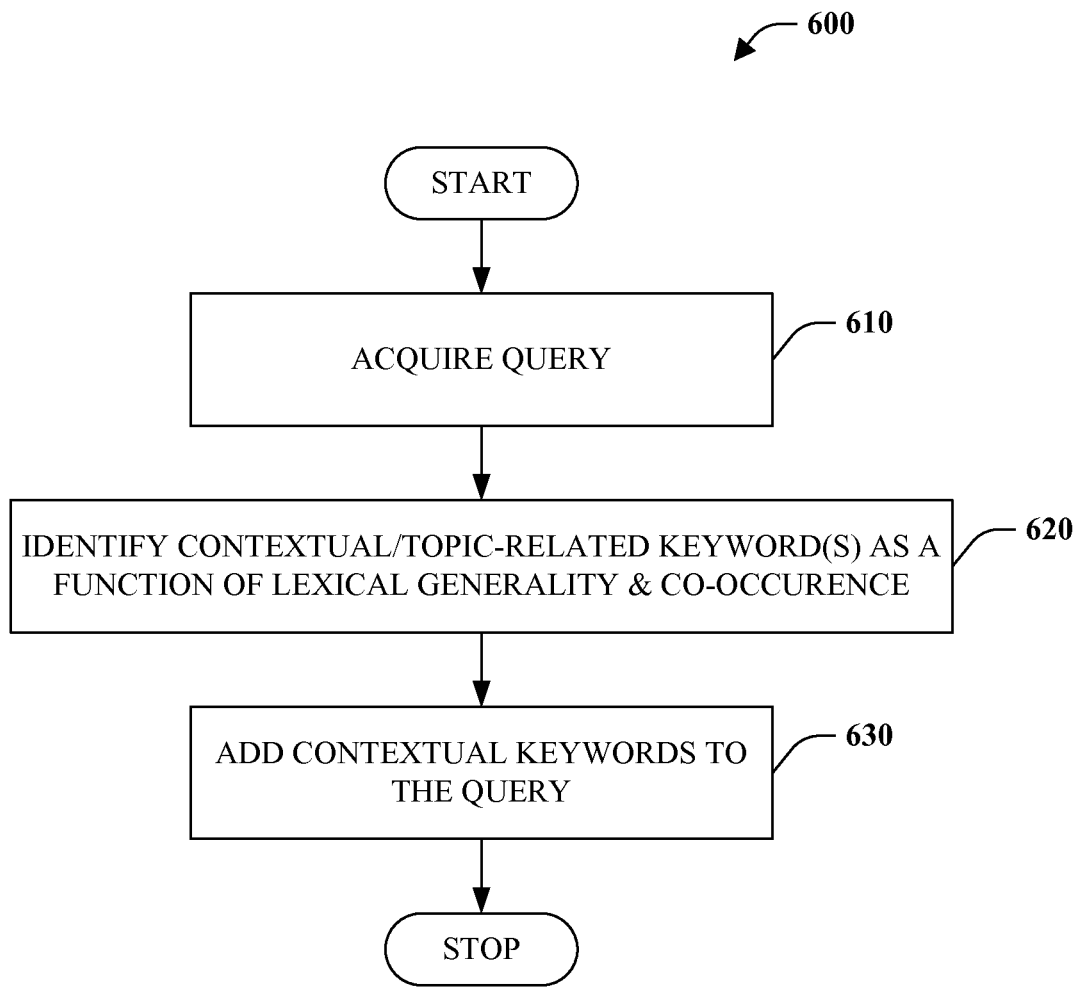
FIG. 6 is a flow chart diagram of a method of topical search.

Referring to FIG. 6, a topical search method 600 is illustrated. At reference numeral 610, a query can be received, retrieved, or otherwise obtained or acquired from a user, for example. At numeral 620, one or more contextual or, in other words, topic-related keywords are identified as a function of lexical generality and optionally co-occurrence, wherein lexical generality refers to the generality of contextual keyword and co-occurrence concerns occurrence of query keywords together in a pseudo-document. By way of example and not limitation, identification of one or more contextual keywords can involve determining contextual keywords that are greater in lexical generality than keywords that form the acquired query. At numeral 630, identified contextual keywords are added to the acquired query.

Figure 7:
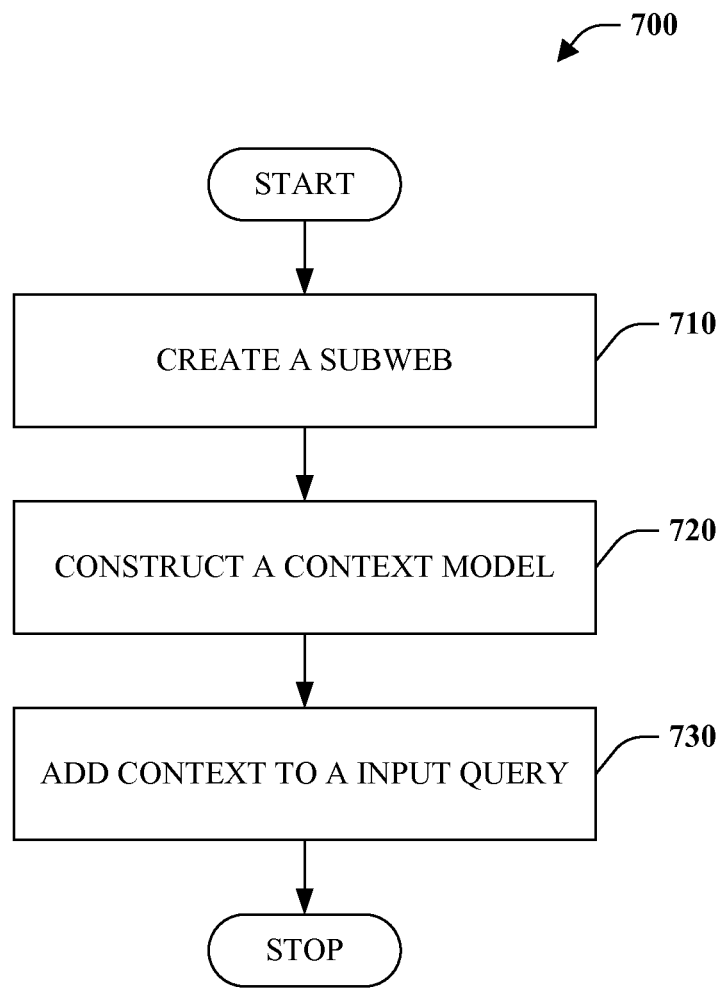
FIG. 7 is a flow chart diagram of a topical search method.

FIG. 7 is a flow chart diagram of a method of topical search 700 is illustrated. At reference numeral 710, a subweb can be built based on a one or more (preferably a few) topic relative and authoritative URLs provided by a creator of a topical search engine, for example, as well as other data such as a click graph. A built subweb can include a collection of topic or domain specific URLs and queries with each unique URL and query including an optional domain relevance weight. At reference numeral 720, a query context model can be constructed utilizing the subweb as well as computed co-occurrence and lexical generality scores, for example. The context query model, which in one embodiment can be a context list, can include a plurality of topic specific queries and related contextual keywords. At numeral 730, contextual keywords can be added to an input query to produce a topic specific query.

Figure 8:
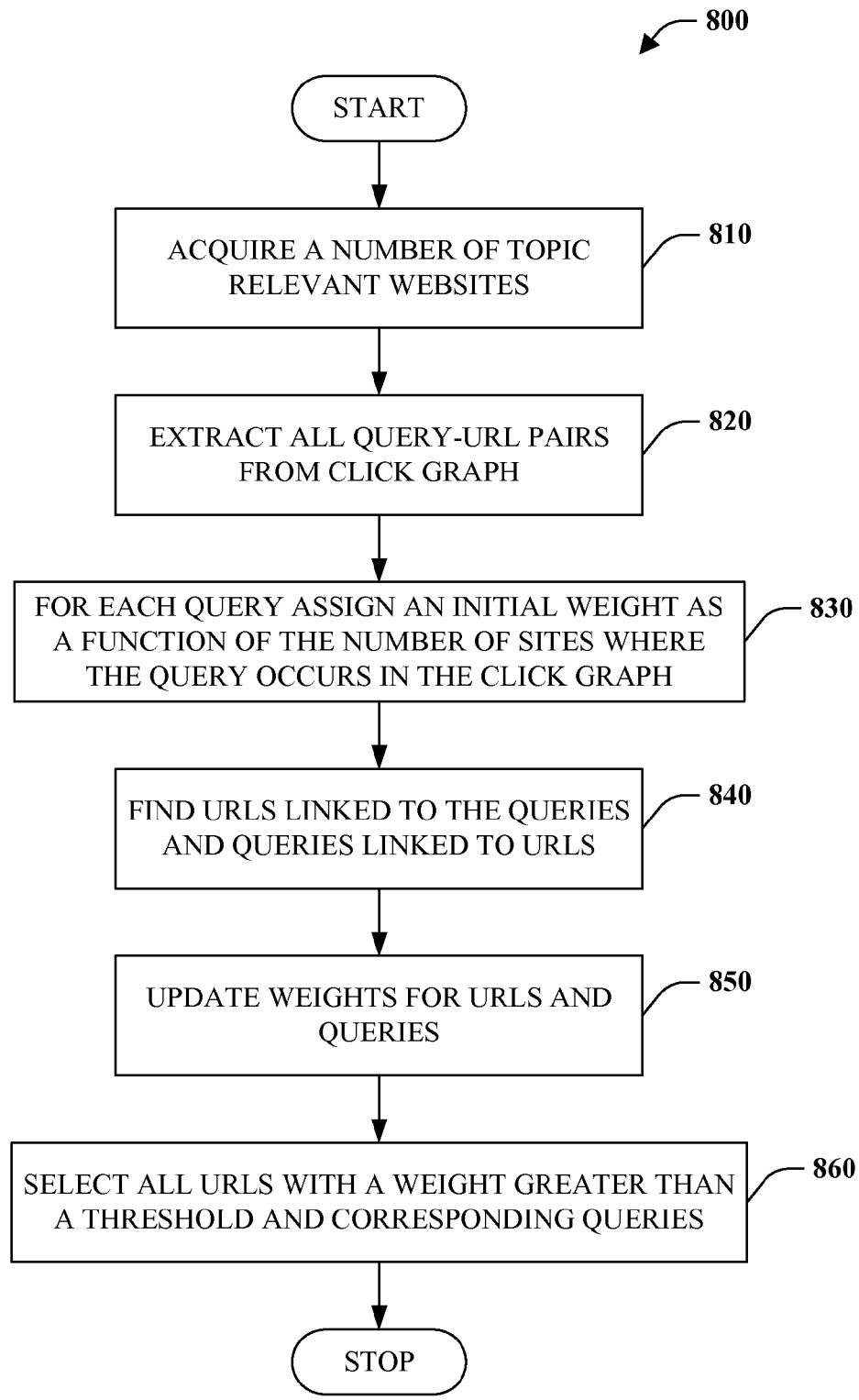
FIG. 8 is a flow chart diagram of a method of subweb construction.

FIG. 8 depicts a method of subweb building 800 for use with respect to a topical search system. At reference numeral 810, a number of topic relevant URLs are acquired from a creator of a topical search engine, for example, as seed sites. The more relevant as well as authoritative the URLs are the better the overall quality of the subweb. At numeral 820, all query-URL pairs are extracted from a click graph (e.g., accessible via a service) as a function of the acquired seed URLs. At reference 830, an initial weight can be assigned to queries as a function of the number of sites where the query appears in a click graph. At numeral 840, a cycle can begin where URLs linked to identified queries and queries linked to identified URLs are located. At 850, URL and query weights can be updated as new URLs and queries are located. At numeral 860, URLs with weights greater than a predetermined threshold and corresponding queries are selected for inclusion in the subweb.

Figure 9:
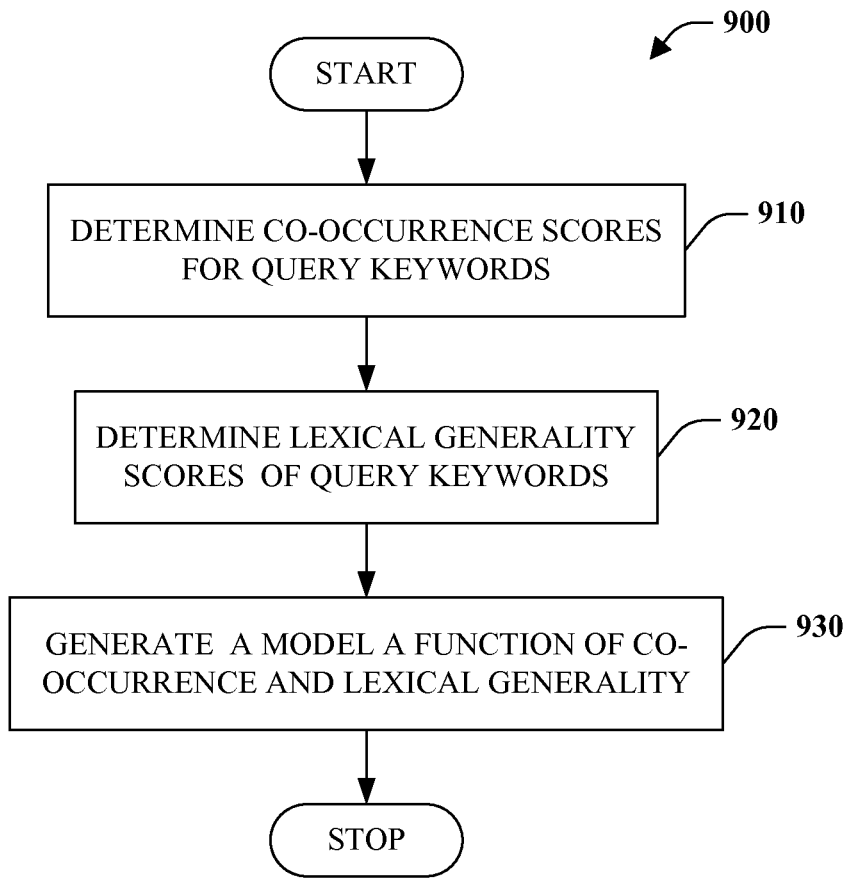
FIG. 9 is a flow chart diagram of a method of generating a query context model.

FIG. 9 is a flow chart diagram of a method of query context-model generation 900. At reference numeral 910, co-occurrence scores between queries and keywords are determined. A generated subweb can include a number of URLs and a set of queries corresponding to each URL. URLs can be treated as pseudo-documents and corresponding query keywords as words in the pseudo-document. The co-occurrence score measures the probability of a contextual keyword "c1" co-occurring with a query n-gram "n1" in a pseudo-document, given that "n1" is observed in the pseudo-document.

At numeral 920, lexical generality scores are determined for query keywords. More specifically, given a set of topical queries, lexical generality of a keyword is the number of other unique keywords it appears with in queries. The lexical generality of a query (e.g., query n-gram) can be considered equal to the lexical generality score of its most general query keyword (e.g., unigram).

At reference 930, a query context model or the like is generated as a function of a co-occurrence and lexical generality scores, among other things. The query context model can identify topical queries and corresponding contextual keywords that can be added to the queries. The contextual model can be generated utilizing a number of constraints on contextual keywords to ensure that context can be added without harming query intent. For example, the lexical generality of a contextual keyword can be required to be greater than the lexical generality of a query. A maximum number of contextual keywords that can be added can also be defined as well as acceptable co-occurrence values and co-occurrence ranges.

Figure 10:
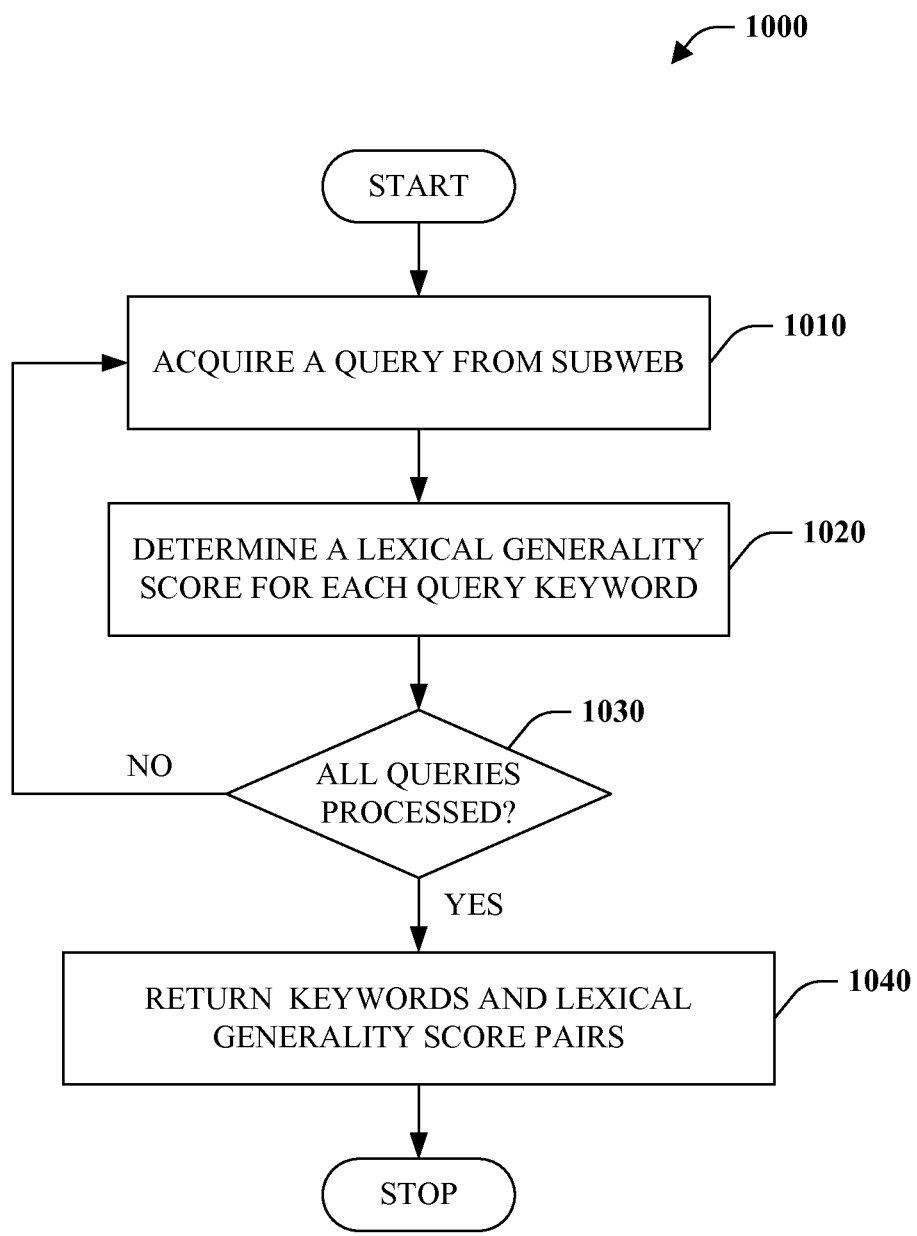
FIG. 10 is a flow chart diagram of a method of lexical generality scoring.

FIG. 10 is a flow chart diagram of a method of iterative lexical-generality scoring 1000. At reference numeral 1010, a query is acquired from a previously constructed subweb. For each keyword comprising the query, a lexical generality score is determined at 1020. A determination is made at reference numeral 1030, as to whether all queries in the subweb have been processed. If not all queries have been processed ("NO"), the method loops back to reference 1010 where the next query is acquired for processing. If, however, all queries have been processed ("YES"), all keywords and lexical generality scores are returned or otherwise persisted for later access.

Figure 11:
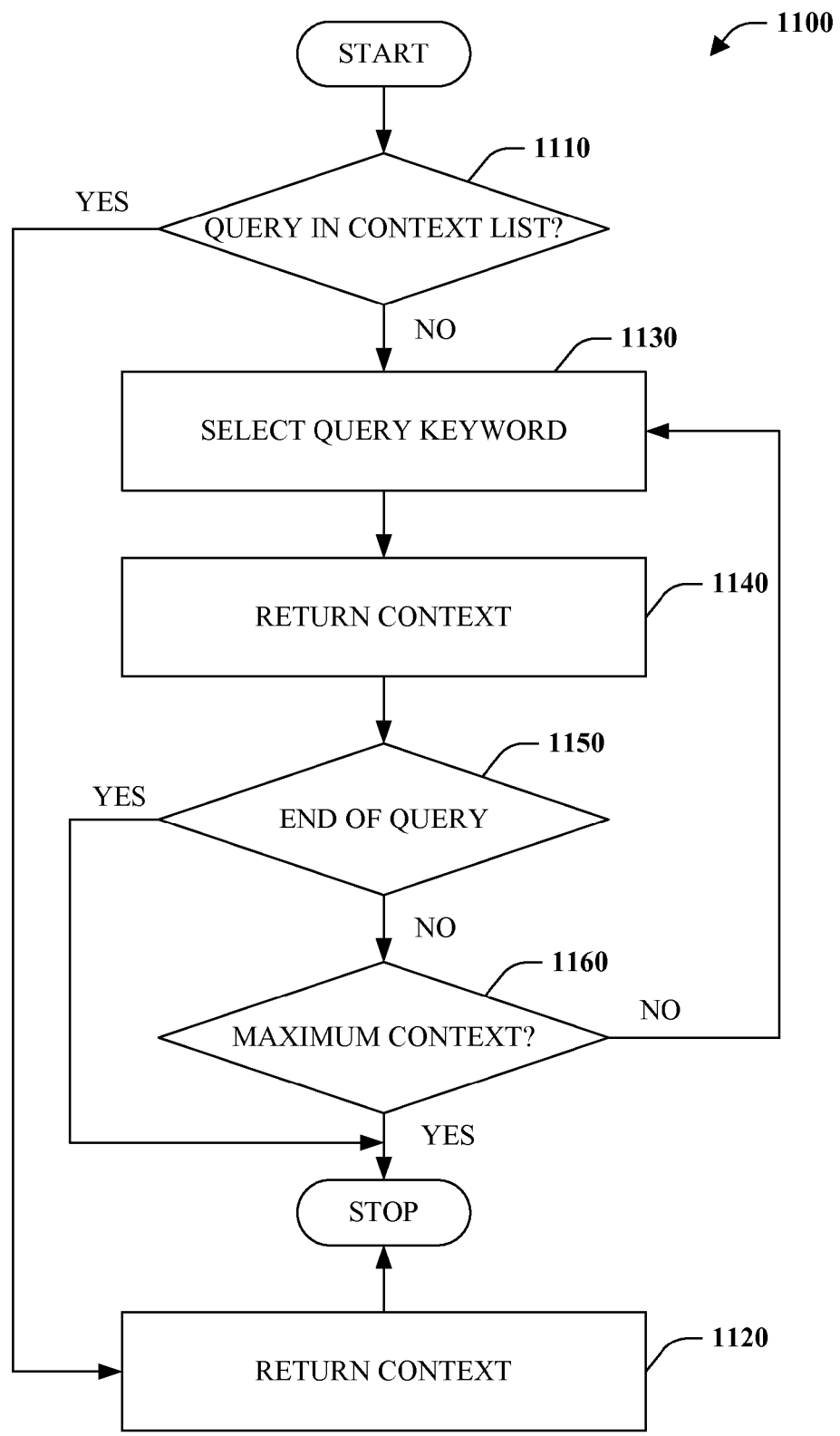
FIG. 11 is a flow chart diagram of a method of topical query contextualization.

FIG. 11 illustrates a method of topical query contextualization 1100. At reference numeral 1110, a check is made as to whether an input query is located in a query context model or in one embodiment a context list. If the query is located in the context list ("YES"), context is acquired from the context list and returned at 1120. If the query is not located in the context model or list ("NO"), a query keyword is selected at numeral 1130, and context for that keyword is looked up and returned at 1140. At reference 1150, a check is made as to whether the end of the query has been reached, or in other words, whether all the keywords comprising the query have been processed. If the end of the query has been reached ("YES"), the method terminates. However, if all query elements have not been processed ("NO"), the method continues at reference 1160 where a check is made pertaining to whether or not a maximum context or number of contextual keywords has been reached with respect to the query. If the maximum has been reached ("YES"), the method terminates. Otherwise ("NO"), the method returns to numeral 1130 where the next query keyword is select.

As used herein, the terms "component," "system," and "engine" as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

"Persistent data" or the like is intended to refer to data stored on a non-volatile medium that exists across application sessions. In other words, the persistent data survives application startup and termination. By contrast, "transient data," often saved on a volatile medium such as memory, is created within or during an application session and is discarded at the end of the session. Similarly, the term "persist," or various forms thereof (e.g., persists, persisting, persisted . . . ), is intended to refer to storing data in a persistent form or as persistent data.

A "subweb" as used herein is a collection of topic or domain specific documents or URLs and query. Each unique URL and query can have a corresponding domain relevance weight.

A "click graph" can refer to a graph of users' queries and URLs they selected or "clicked on." In one embodiment, the click graph can be represented as a set of triples "<q, u, c>." This triple can be interpreted to mean that URL "u" was clicked "c" times by users when they issued a query "q." The links between queries and URLs are used to create a subweb and the click values can be used to create a query context model from the subweb.

A "keyword," and various forms thereof, generally refers to a word specified with respect to a search to enable location of particular information or data, among other things. As used herein, a "query keyword" refers to a word specified with respect to a query such as an input search query. By contrast, a "contextual keyword" or "topic-related keyword" refers to a word that can be added to a query to bias the results toward a particular topic or domain. Further, a "contextual keyword" or "topic-related keyword" can be derived from prior queries and query keywords, as described herein.

An "n-gram query" is intended to refer to "n" sub-strings of a query or more particularly a query including "n" query keywords. Accordingly, a "unigram" is a query including one query keyword.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Additionally, while photography was utilized as a topic in the examples, the claimed subject matter is not limited thereto. Further, to facilitate clarity and understanding, the examples utilize real world queries and keywords, and trademark symbols were not utilized where otherwise applicable. However, it is to be appreciated that "Olympus," "Canon," "Sony," "Nikon," among others, are registered trademarks of respective companies.

Figure 12:
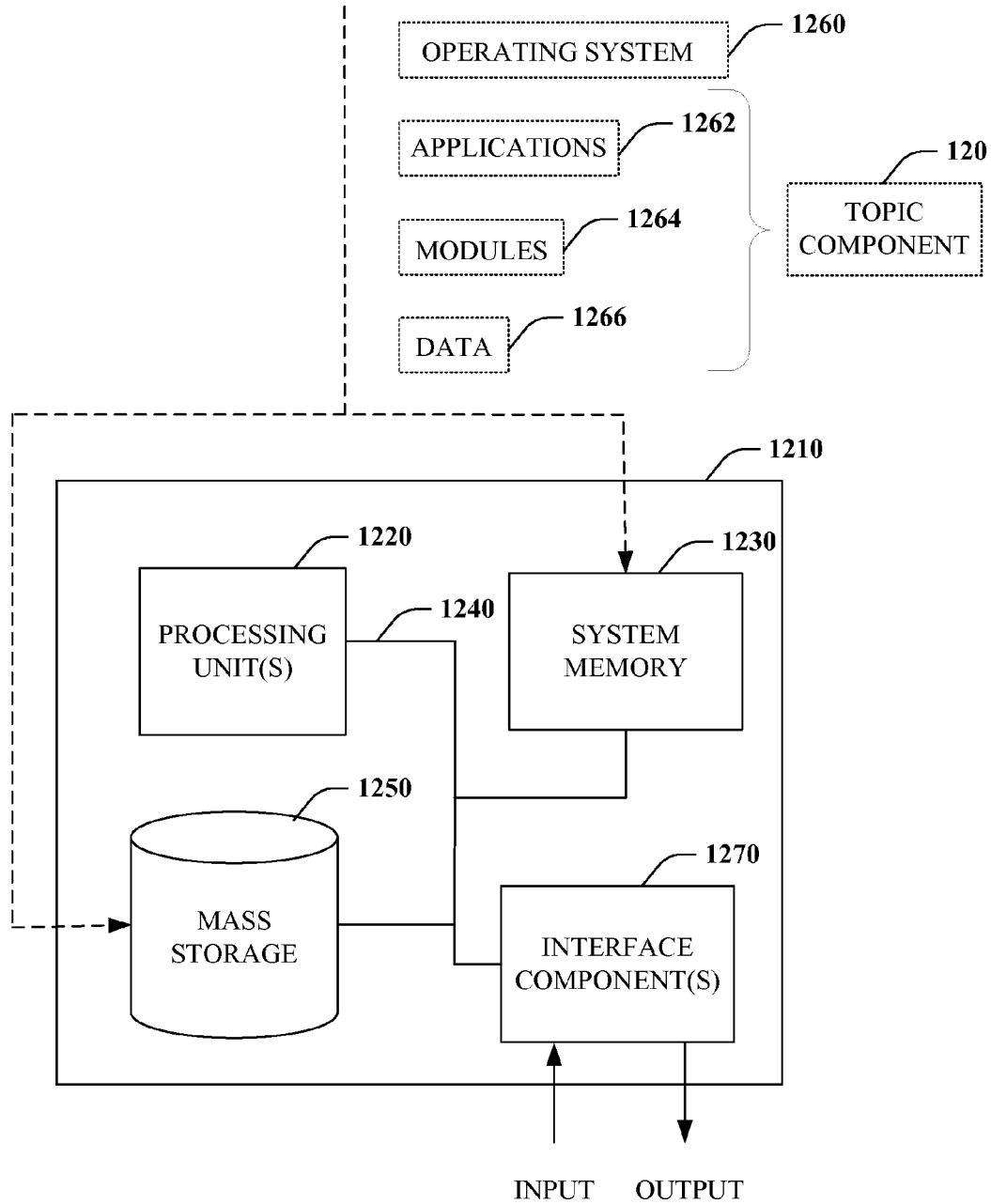
FIG. 12 is a schematic block diagram illustrating a suitable operating environment for aspects of the subject disclosure.

In order to provide a context for the claimed subject matter, FIG. 12 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 12, illustrated is an example computer or computing device 1210 (e.g., desktop, laptop, server, hand-held, programmable consumer or industrial electronics, set-top box, game system . . . ). The computer 1210 includes one or more processing units or processors 1220, system memory 1230, system bus 1240, mass storage 1250, and one or more interface components 1270. The system bus 1240 communicatively couples at least the above system components. However, it is to be appreciated that in its simplest form the computer 1210 can include one or more processors 1220 coupled to system memory 1230 that execute various computer executable actions, instructions, and or components.

The processing unit 1220 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processing unit 1220 may also be implemented as a combination of computing devices, for example a combination of a DSP and a microprocessor, a plurality of microprocessors, multi-core processors, one or more microprocessors in conjunction with a DSP core, or any other such configuration.

The computer 1210 can include or otherwise interact with a variety of computer-readable media to facilitate control of the computer 1210 to implement one or more aspects of the claimed subject matter. The computer-readable media can be any available media that can be accessed by the computer 1210 and includes volatile and nonvolatile media and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 1210.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

System memory 1230 and mass storage 1250 are examples of computer-readable storage media. Depending on the exact configuration and type of computing device, system memory 1230 may be volatile (e.g., RAM), non-volatile (e.g., ROM, flash memory . . . ) or some combination of the two. By way of example, the basic input/output system (BIOS), including basic routines to transfer information between elements within the computer 1210, such as during start-up, can be stored in nonvolatile memory, while volatile memory can act as external cache memory to facilitate processing by the processing unit 1220, among other things.

Mass storage 1250 includes removable/non-removable, volatile/non-volatile computer storage media for storage of large amounts of data relative to the system memory 1230. For example, mass storage 1250 includes, but is not limited to, one or more devices such as a magnetic or optical disk drive, floppy disk drive, flash memory, solid-state drive, or memory stick.

System memory 1230 and mass storage 1250 can include or have stored therein operating system 1260, one or more applications 1262, one or more program modules 1264, and data 1266. The operating system 1260 acts to control and allocate resources of the computer 1210. Applications 1262 include one or both of system and application software and can leverage management of resources by operating system 1260 through program modules 1264 and data 1266 stored in system memory 1230 and/or mass storage 1250 to perform one or more actions. Accordingly, applications 1262 can turn a general-purpose computer 1210 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, topic component 120 including context generation component 210 and query alteration component 230 can be an application 1262 or part of an application 1262 and include one or more modules 1264 and data 1266 stored in memory and/or mass storage 1250 whose functionality can be realized when executed by one or more processors or processing units 1220, as shown.

The computer 1210 also includes one or more interface components 1270 that are communicatively coupled to the system bus 1240 and facilitate interaction with the computer 1210. By way of example, the interface component 1270 can be a port (e.g., serial, parallel, PCMCIA, USB, FireWire . . . ) or an interface card (e.g., sound, video . . . ) or the like. In one example implementation, the interface component 1270 can be embodied as a user input/output interface to enable a user to enter commands and information into the computer 1210 through one or more input devices (e.g., pointing device such as a mouse, trackball, stylus, touch pad, keyboard, microphone, joystick, game pad, satellite dish, scanner, camera, other computer . . . ). In another example implementation, the interface component 1270 can be embodied as an output peripheral interface to supply output to displays (e.g., CRT, LCD, plasma . . . ), speakers, printers, and/or other computers, among other things. Still further yet, the interface component 1270 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of facilitating search, comprising:
    employing at least one processor configured to execute computer-executable instructions stored in memory to perform the following acts:
    identifying at least one contextual keyword from a structure based on a received query, the structure comprises one or more contextual keywords for a number of queries associated with a specific topic based on at least one topic-relevant seed uniform resource locator, one or more queries associated with the at least one seed uniform resource locator, extracted from a record of user queries and selected uniform resource locators for each user query, one or more associated uniform resources locators derived from the one or more associated queries, and one or more additional queries derived from the one or more associated uniform resource locators, wherein the additional queries are not directly associated with the at least one seed uniform resource locator in the record; and
    adding the at least one contextual keyword to the received query restricting the query to the specific topic.

2. The method of claim 1 further comprising adding the at least one contextual keyword for each of a plurality of received query keywords.

3. The method of claim 1 further comprising providing the received query and the at least one contextual keyword to a search engine.

4. The method of claim 1, identifying the at least one contextual keyword from the structure, the contextual keyword is of greater generality than the received query.

5. The method of claim 4, identifying the at least one contextual keyword from the structure that has a co-occurrence score with the received query greater than a predetermined co-occurrence threshold.

6. The method of claim 5, identifying the at least one contextual keyword from the structure that has a co-occurrence score with the received query within a predetermined range if lexical generality of the query is less than a predetermined generality threshold.

7. A search system, comprising:
    a processor coupled to a memory, the processor configured to execute the following computer-executable component stored in the memory:
    a first component configured to automatically identify a set of queries related to a particular topic as a function of a one or more topic-relevant seed uniform resource locators (URLs), a record of previously submitted queries and selected URLs, and one or more additional URLs derived from one or more queries associated with the one or more seed URLs, wherein one or more additional queries of the set of queries derived from the additional URLs are not directly associated with the one or more seed URLs in the record.

8. The system of claim 7 further comprising a second component configured to identify additional queries from the one or more additional URLs based on the record of previously submitted queries and selected URLs.

9. The system of claim 8 further comprising a third component configured to specify a weight with respect to the one or more additional URLs and/or the additional queries.

10. The system of claim 9 further comprising a fourth component configured to filter one or more of the one or more additional URLs and/or the additional queries as a function of the weight and a weight threshold.

11. The system of claim 7 further comprising a second component configured to compute co-occurrence scores between query keywords with respect to each corresponding URL.

12. The system of claim 11 further comprising a third component configured to determine lexical generality scores of the query keywords.

13. The system of claim 12 further comprising a fourth component configured to identify one or more contextual keywords for query keywords as a function of the co-occurrence scores and the lexical generality scores.

14. A computer-readable storage medium having instructions stored thereon that enable at least one processor to perform a method upon execution of the instructions, the method comprising:
    identifying one or more queries based on one or more topic-relevant seed uniform resource locators (URLs), a record of previously submitted queries and selected URLs, and one or more additional URLs derived from one or more queries associated with the one or more seed URLs, wherein one or more additional queries of the one of the one or more queries identified from the additional URLs are not directly associated with the one or more seed URLs in the record;
    determining a co-occurrence score for one or more keywords comprising the one or more queries;
    determining a lexical generality score for the one or more keywords; and
    saving the one or more keywords, and co-occurrence and lexical generality scores to a persistent store.

15. The method of claim 14, determining a lexical generality score of one of the one or more keywords comprising one of the one or more queries comprises identifying a number of unique keywords that appear with the one of the one or more keywords in the one or more queries.

16. The method of claim 15, determining the lexical generality score comprises identifying the lexical generality score of the most general keyword in a multiple keyword query.

17. The method of claim 14 further comprising identifying a single keyword for a received query given a co-occurrence score of the single keyword and the received query is above a predetermined threshold.

18. The method of claim 14 further comprising identifying multiple keywords for a received query given the lexical generality score of the received query is below a first predetermined threshold and co-occurrence scores between each of the multiple keywords and the received query are between a second predetermined threshold and a third predetermined threshold.

19. The method of claim 14 further comprises:
submitting at least one query extracted from the record based on the one or more topic-relevant seed URLs to a search engine;
acquiring the one or more additional URLs returned from the search engine as search results; and
extracting one or more other queries from the record for the one or more additional URLs.

20. The method of claim 14, determining the co-occurrence score for the one or more keywords comprising the one or more queries comprises determining a frequency for each distinct query keyword of the one or more keywords by summing clicks that a URL received from a query that included the distinct query keyword.

* * * * *